(12) United States Patent
Tropf

(10) Patent No.: US 7,844,104 B2
(45) Date of Patent: Nov. 30, 2010

(54) METHOD FOR ESTABLISHING A DATA COLLECTION AND METHOD AND DEVICE FOR GRIPPING AN OBJECT

(76) Inventor: Hermann Tropf, Blumenstrasse 5, St. Leon-Rot (DE) 68789

(*) Notice: Subject to any disclaimer, the term of this patent is extended or adjusted under 35 U.S.C. 154(b) by 1176 days.

(21) Appl. No.: 10/529,174

(22) PCT Filed: Sep. 18, 2003

(86) PCT No.: PCT/EP03/10411
§ 371 (c)(1),
(2), (4) Date: Jul. 11, 2006

(87) PCT Pub. No.: WO2004/029864

PCT Pub. Date: Apr. 8, 2004

(65) Prior Publication Data
US 2007/0055406 A1     Mar. 8, 2007

(30) Foreign Application Priority Data
Sep. 23, 2002 (DE) ................................ 102 44 275
Aug. 21, 2003 (DE) ................................ 103 38 323

(51) Int. Cl.
*G06K 9/00* (2006.01)
(52) U.S. Cl. ........................................ 382/153; 382/154
(58) Field of Classification Search .................. None
See application file for complete search history.

(56) References Cited

U.S. PATENT DOCUMENTS 6,763,283 B1 *  7/2004  Murakami .................. 700/259
2001/0040225 A1 *  11/2001  Kodama et al. ........ 250/559.36

FOREIGN PATENT DOCUMENTS

EP          0226938     7/1987
JP          58213382    3/1984

OTHER PUBLICATIONS

Shirai, et al., "Extraction of the Line Drawings of 3-Dimensional Objects by Sequential Illumination from Several Directions," Pattern Recognition, 1972, pp. 343-351, vol. 4.

* cited by examiner

*Primary Examiner*—Wes Tucker
*Assistant Examiner*—Elisa M Rice
(74) *Attorney, Agent, or Firm*—IP Strategies

(57) ABSTRACT

Disclosed are a method and a device for establishing a data collection with the aid of at least one imaging apparatus (1, 2, 3) and at least one illumination device (11, 12, 13). According to the inventive method, an object is recorded from at least three different directions while being illuminated from at least three directions in reflected light. Each direction of recording lies essentially opposite a direction of illumination such that at least one contour of the object is visible with an illuminated side and a shaded side thereof from each of the three directions of recording while substantially the entire object is recorded from the at least three directions of recording by the at least one imaging apparatus. The directions of recording and the directions of illumination can be moved in a defined manner at several degrees of freedom relative to the object. The recorded images and/or data derived therefrom are stored in the data collection.

15 Claims, 4 Drawing Sheets

METHOD FOR ESTABLISHING A DATA COLLECTION AND METHOD AND DEVICE FOR GRIPPING AN OBJECT

The invention relates to sensing, gripping or processing unordered or badly ordered or inaccurately positioned parts, particularly, bulk parts, preferably by means of a robotic device or other manipulator devices.

On this subject there is a wealth of, mostly academic, literature mainly involved with methods of image processing. The methods employed for image analysis are mostly contour-oriented and model-based. Contour-based methods furnish, as compared to surface-based methods, in general, results which are more stable and precise and are needed as a rule for partly concealed workpieces. In model-based methods the workpiece geometry (or parts thereof) are input to start with, e.g. from CAD data.

One problem decisive in realizing such a system in practice is that only part of the workpiece contours can be reliably represented with known camera and illumination arrangements.

In DE 3545960 an attempt is made to obtain a plurality of images using just a single camera under various illumination conditions; although this enhances the probability of an edge being represented in one of these images, this is not, however, assured, for example, when at the edge the background has the same surface properties as the upper workpiece and the same spatial orientation.

It is only in special cases with known illumination arrangements that reliable image features materialize, for example with bright cylindrical parts resulting in a reliably bright reflecting generatrix line. This is why, despite the major requirement in practice, robotic devices have hitherto hardly been put to use for three-dimensional bulk gripping applications; achieving this object as applicable in general compatible with actual practice has failed to come about hitherto because certain contours under unfavorable conditions are poorly represented or not at all. Getting round this problem necessitated highly involved mechanical complications; for instance, by spreading the parts on a transparent conveyor belt with back lighting and—if the parts lie one on the other—with a controllable jolting device in the hope of jolting the items apart so as to represent them fully contoured, all this, before they are even localized via an image processing system and gripped by a robotic device.

Which contours can be reliably represented and which not, depends on the chance spatial orientation of the workpieces with known camera and illumination arrangements. This makes it extremely difficult to achieve reliable image analysis, especially when the task involved requires a true three-dimensional position determination of the workpieces (involving in general three position parameters and three orientation parameters).

One way of getting round this, is the transition from contour-oriented processing to surface three-dimensional analysis by means of structured light. This method is, however, technically extremely complicated and necessitates exotic illumination components.

On object of the invention is reliable representation of all, or as many unconcealed contours of a workpiece as possible, irrespective of the random spatial orientation of the workpiece in making use of simple standard illumination components, particularly without structured light.

Another object is to permit learning by simple pointing when setting up the system and data comparison in automatic operation without having to input model data in advance when setting up the system.

These objects are achieved by a method as set forth in claim 1 and claim 12 and by a device as set forth in claim 18. Advantageous embodiments read from the dependent claims.

In accordance therewith, a method is made available for establishing a data collection with the aid of at least one imaging means and at least one illuminating device, wherein an object is imaged from at least three different imaging directions and illuminated from at least three different illumination directions, each in direct light, one imaging direction each being substantially opposed to one illumination direction, so that from each of the three imaging directions at least one contour each of the object appears with a light side and a shadow side of the object, and substantially the complete object is imaged from the at least three imaging directions by the at least one imaging means, wherein the imaging directions and the illumination directions, on the one hand, and the object, on the other, are movable defined relative to each other with several degrees of freedom, and the images and/or the data derived therefrom are stored in the data collection.

In one aspect of the invention images can be made in various relative positions of image capture devices and illumination devices, on the one hand, and of the object, on the other.

In another aspect of the invention changes in the relative positions between the images can be captured and assigned to the images and wherein position indications assigned to the images or to the data derived therefrom are stored in the data collection.

In yet another aspect of the invention several images can be made between which the position of the image capture devices and illumination devices is changed mutually.

In still another aspect of the invention the position of the image capture devices and illumination devices can be determined by a robotic setting.

In another aspect of the invention several images can be made between which the position of the object is changed.

In yet another aspect of the invention the position of the object can be changed by means of a robotic device.

A further aspect of the invention provides a data collection with images and/or data derived therefrom, as well as a computer-readable storage medium with data which form a data collection.

In another further aspect of the invention a method is made available for gripping an object from a plurality of objects with the aid of at least one imaging means and at least one illuminating device, wherein the object is imaged from at least three different imaging directions and illuminated from at least three different illumination directions, each in direct light, one imaging direction each being substantially opposed to one illumination direction, so that from each of the three imaging directions at least one contour each of the object appears with a light side and a shadow side of the object, and substantially the complete object is imaged from the at least three imaging directions by the at least one imaging means.

In still another further aspect of the invention reference images and/or data derived therefrom contained in a data collection as set forth in claim 10 can be used.

In yet another further aspect of the invention images of the object and images or derived data in the data collection can be compared.

In yet another further aspect of the invention the illumination device and the image capture devices can be arranged substantially star-shaped, the illumination directions as viewed from one direction comprising in pairs an angle between 75 degrees and 145 degrees, preferably 120 degrees and as viewed from one direction the imaging directions comprising in pairs an angle between 75 degrees and 145 degrees, preferably 120 degrees.

In still another further aspect of the invention wherein each imaging can be performed substantially from the imaging directions via light from the substantially opposed illumination direction, preferably by switching and/or by polarization and/or spectral filtering and/or by use of at least one color rendering image capture device.

A further aspect of the invention provides a computer-readable storage means with a method for establishing a data collection.

Still another further aspect of the invention provides a device for gripping an object from a plurality of objects with at least three image capture devices and at least three direct illumination devices, wherein one image capture device each is substantially opposed to one illumination device, so that from each of the three image capture devices at least one contour each of the object can be imaged with a light side and a shadow side of the object, and substantially the complete object can be imaged by the at least three image capture devices in combination.

Yet another further aspect of the invention provides a device configured to use reference images and/or data derived therefrom contained in a data collection as set forth in claim 10.

In another aspect of the invention the device may further comprise a substantially star-shaped arrangement of illumination devices and image capture devices, whereby as viewed from one direction the illumination directions comprise in pairs an angle between 75 degrees and 145 degrees, preferably 120 degrees and as viewed from one direction the imaging directions comprise in pairs an angle between 75 degrees and 145 degrees, preferably 120 degrees.

In another further aspect of the invention the device may be configured for capturing images via light from the substantially opposed illumination direction, preferably by switching means and/or by polarization and/or spectral filters and/or by at least one color rendering image capture device.

The invention will now be detailed by way of the attached drawing in which.

Figure 1:
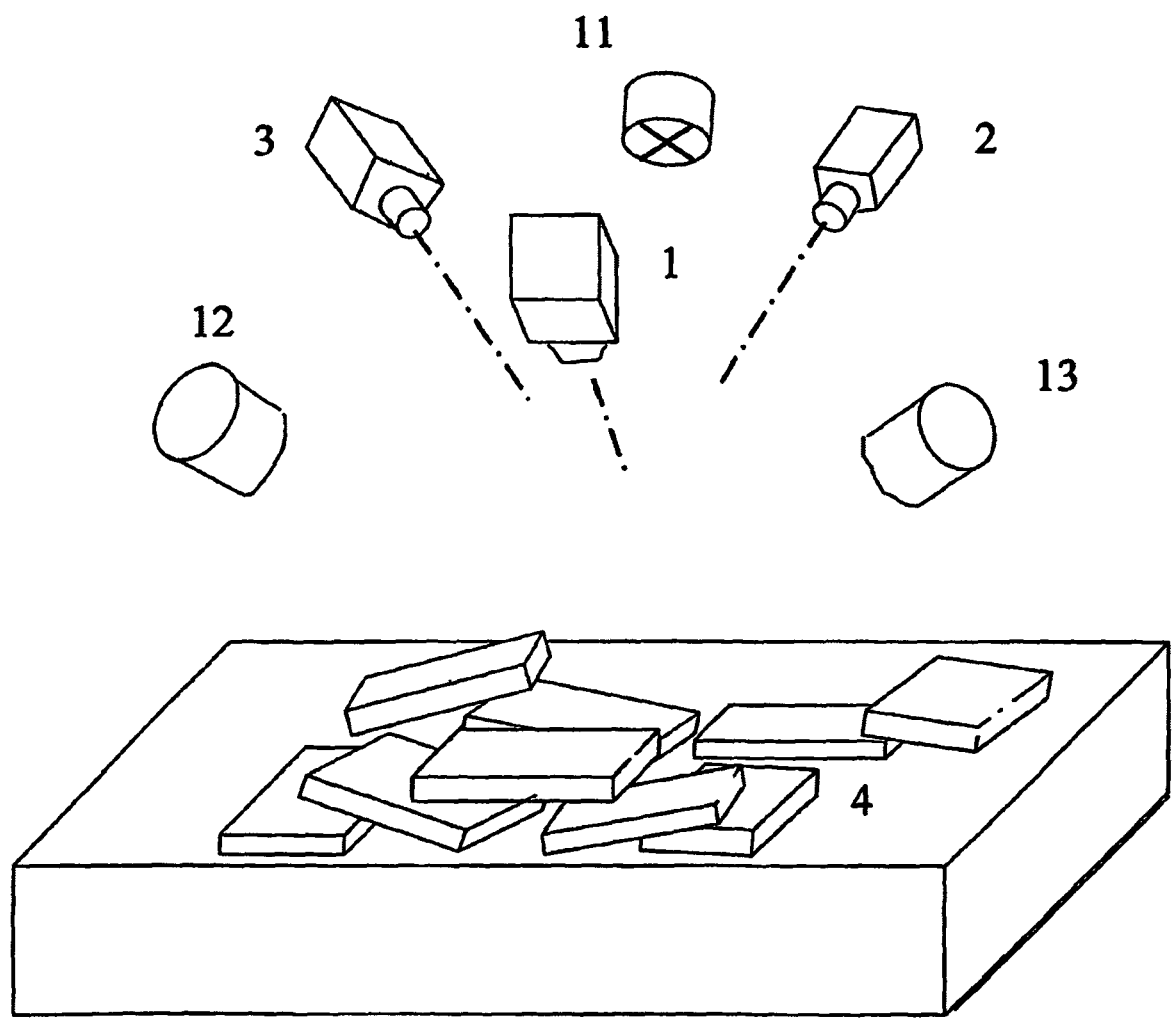
FIG. 1 is a side view of the camera and illumination arrangement in accordance with the present invention.

Referring now to FIG. 1 there is illustrated a side view of the camera and illumination arrangement with the cameras 1, 2, 3 and the illumination devices (shown symbolically) 11 (assigned to camera 1), 12 (assigned to camera 2) and 13 (assigned to camera 3) as well as the bulk workpieces 4. The fixed base as shown can, of course, be replaced, for example, by a transport conveyor or a container.

Figure 2:
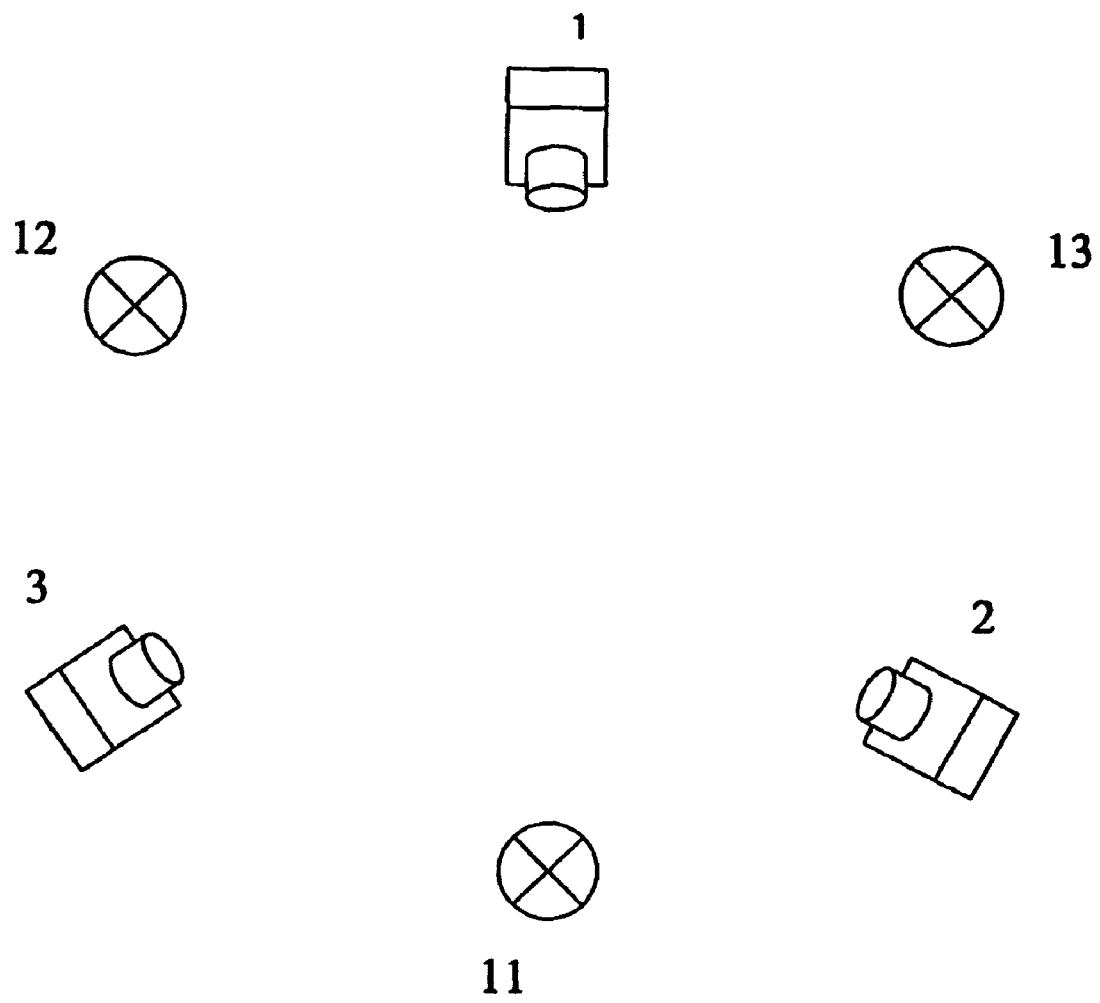
FIG. 2 is a view of the arrangement as shown in FIG. 1 as seen vertically from above.

Referring now to FIG. 2 there is illustrated the arrangement as seen vertically from above.

Figure 3:
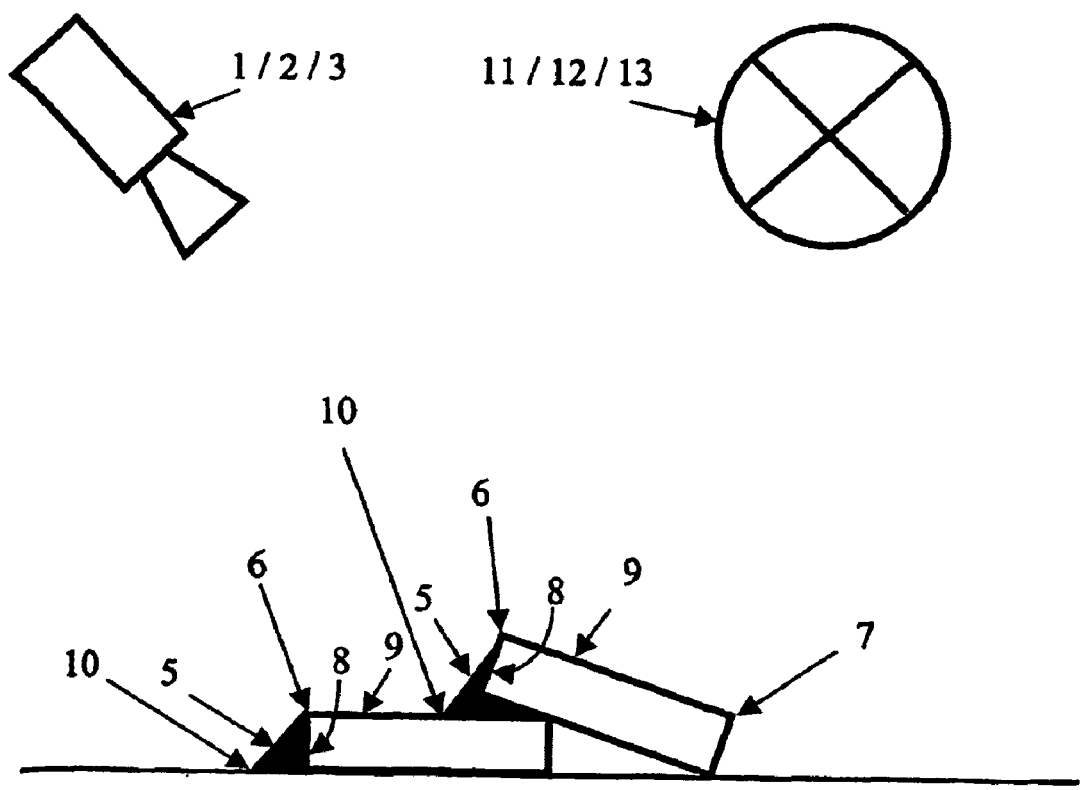
FIG. 3 is a section showing a camera and the illumination thereof in accordance with the present invention.

Referring now to FIG. 3 there is illustrated sectionwise a camera and the associated illumination showing the shadow 5 produced thereby at the edges 6 of the workpiece. The opposite edge 7 of the workpiece is evident, as "seen" by the camera, only under favorable conditions, for example, against a dark base, whereas the edges 6 are reliably "seen" by the camera 1 irrespective of how bright the material is an the three-dimensional position of the workpiece. Indeed, this also applies for bright workpiece surfaces when the illumination is adapted accordingly, i.e. the edges 6 produce in the image a contour. Both workpiece sides of the contour are "seen" by the camera, namely on the one hand the workpiece surface 9 illuminated by the opposite illumination device and, on the other, the workpiece surface 9 not illuminated by the opposite illumination device. The workpiece surface 9 reflects in any case brightly since it is located approximately in the gloss angle (with dull surfaces a small light source is sufficient, but to achieve this with bright surfaces a larger light source is required). In the direction of the camera a shadow 5 exists as "seen" by the camera, i.e. visible (a shadow located on the opposite side of the workpiece would e.g. not be visible): it is in this that the surface 8 always appears darker than the surface 9, irrespective of the surface finish of the workpiece material. This is why the workpiece contour is always reliably imaged as "seen" by the camera, no matter what the background, since the contour is edged by two sides of the same workpiece.

Although the end of the shadow (shadow edge 10) likewise forms a contour, this has the inverse polarity in the image: in the camera image the brightness at the workpiece contour changes from bright to dark as viewed from top to bottom, at the edge of the shadow from dark to bright in thus making it very simple to distinguish in image analysis workpiece contours from shadow contours (although a shadow occurring at the workpiece edge 7 would have invented polarity, this is invisible to the camera).

Figure 4:
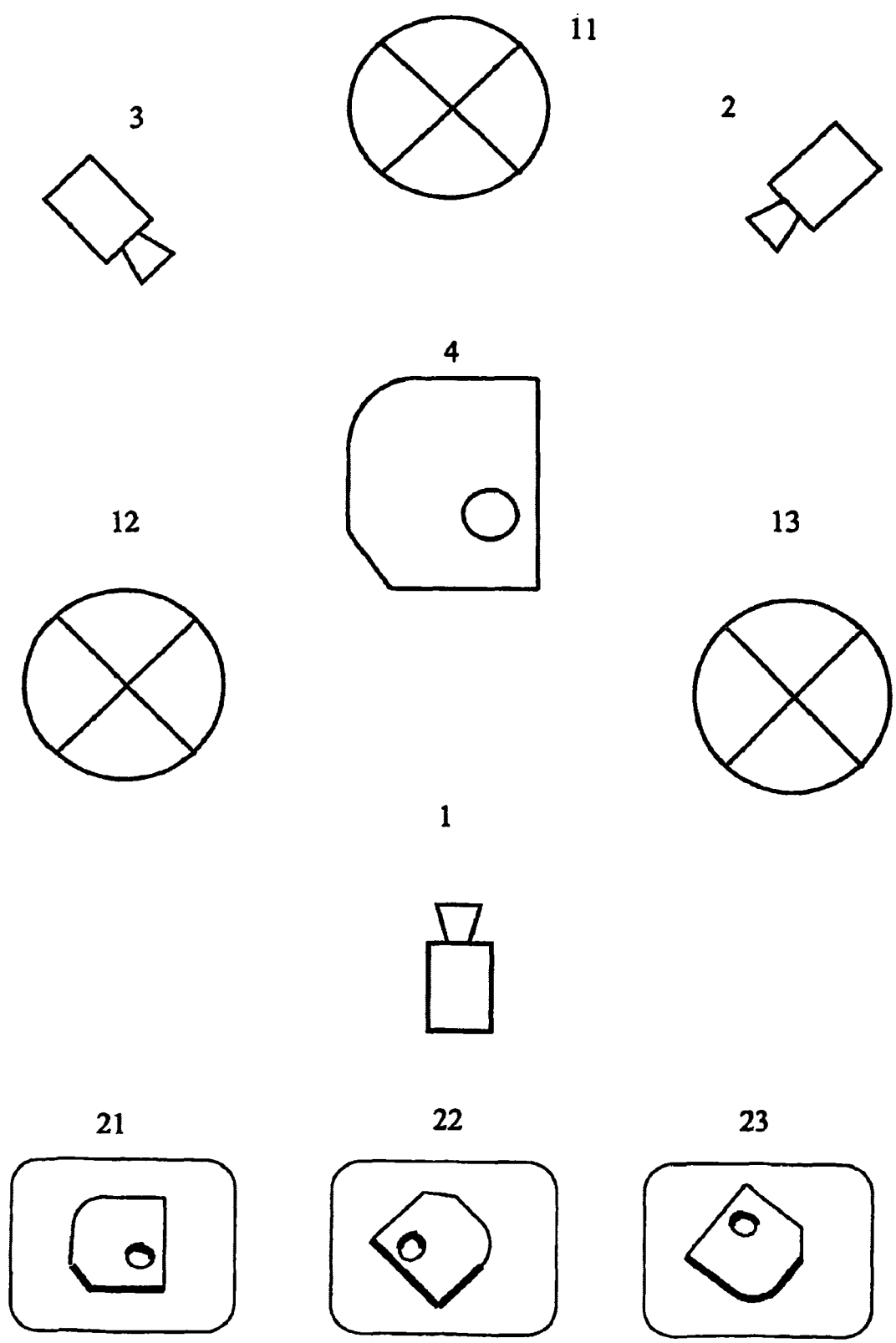
FIG. 4 is a workpiece scene and three cameras as well as diagrammatic representations of the images captured by the cameras.

Referring now to FIG. 4 there is illustrated, as viewed from above, a workpiece scene and three cameras together with the three separate images 21 (for camera 1), 22 (for camera 2), 23 (for camera 3) showing the shadow as a thick edge.

One particular advantage of the invention is that with the arrangement of at least three cameras and correspondingly engineered fields of view every contour section in at least one camera is in the situation (edge 6) as shown in FIG. 3 and for this camera the contour reliably appears in the image.

A subsequent image analysis process than has all information as needed to achieve type or position recognition (apart from any geometric ambiguities existing basically). All non-concealed contours of the workpiece top surface are reliably represented in at least one camera.

These highly advantageous properties in contouring are even maintained in principle when separating the channels as it reads from claim 4 or 5 is not performed, i.e. when no fully developed shadow forms but just a half-shadow as is the case, for instance, when the three illumination devices opposite the cameras are formed by a single ring light and no further measures are undertaken for channel separation. Although the then resulting half-shadow is not as significant as a full shadow as is achieved in channel separation, it is sufficient in most cases.

In three-dimensional analysis the particularly advantage afforded by the described arrangement with three cameras located at an angle to each other is that minor rotations of the workpiece spatially result in a significant change in a contour image (it being generally the case that several contour images change at the same time) such that three-dimensional position sensing is possible also with good numerical accuracy and teaching simply by presenting workpieces in various positions is possible without having to recourse to model information.

It is particularly of advantage that for three-dimensional position sensing the geometry of the workpiece edges does not need to be known when sensing is achieved by comparison with the images captured in defined relative positions in setting up the system or data derived therefrom in a reference data collection or reference data base, since in image analysis workpiece contours are very easy to distinguish from shadow contours as a function of the ambient conditions (see above) without having to make use of prior knowledge as to the workpiece geometry. In approaches as known hitherto reliably distinguishing workpiece edges from shadow edges first occurred in the scope of the (in generally model-based) image analysis process; now making this distinction is done in advance and without prior knowledge, which in turn greatly simplifies subsequent analysis in rendering it more robust.

Further advantages materialize from moving the cameras and illumination devices together against the workpiece. For example, when securing camera and illumination device to the robotic device in setting up the system, precisely the same relative image capture and illumination situation is simulated as is later with the robotic device fixed and the part changed in position. Unanticipated effects such as e.g. dazzle and shadows occur in precisely the same way during teaching and sensing which in turn first makes teaching possible by straight presentation and comparison in keeping with actual practice. This advantageous situation does not exist when cameras and illumination devices are moved separately. In other words, simple learning by presentation and sensing by comparison with that presented, without model information, is now achieved in conjunction with reliable and explicit contour extraction solely at body edges because of the selected camera and illumination device arrangement, and precisely reproducible imaging by moving illumination device and camera together relative to the workpiece.

The latter is also achieved when, in addition, also cameras and illumination devices are mutually movable, but always stand in the same, or at least approximately the same, relative position to each other when capturing the image.

This property also results in multiphase functioning being easier and more reliably achievable by the robotic device following a first image capture in a first movement roughly adapting firstly the position of the cameras relative to the workpiece and then in subsequent image capture and analysis achieving fine adaptation for precise gripping. It is, of course, just as possible that the whole procedure is achievable in more than two phases in sequence or continually.

Although multi-camera arrangements with transmitted, instead of direct, light produce just as reliable contour images, these are achievable more in simple special cases possible. This applies particularly to multidimensional position sensing; in transmitted light arrangements so illuminated surfaces of the parts are to be seen, for recognizing jumbled parts, as shown in FIG. 1, transmitted light arrangements are hardly achievable to meet the requirements of actual practice.

Referring now to FIG. 2 there is illustrated a symmetrical arrangement with 3 cameras. The arrangement and method as now described relate, of course, just as well to arrangements similar in sense but which deviate from a symmetrical geometry. Cameras and lamps do not need to be at the same level both one to the other and mutually, i.e. it is not necessary to divide the 380 degree scope in equal angles, there being no basic requirement for the fields of view to cover the 360 degree scope completely (the singular result of analysis is a function of the workpiece geometry, e.g. with symmetries or conversely with highly significant local contour shapes).

Although FIGS. 1 and 2 show arrangements with cameras directed looking in from the outside they must not necessary be directed in this way, e.g. as with workpieces with inner edges such as e.g. circular rings.

Structured illumination is not necessary, although, of course, it is just as possible to additionally use structure illumination to achieve e.g. a better separation from interference light via subsequent image processing software filters.

It is, of course, just as possible to achieve the described arrangement instead of with three cameras also with an arrangement of mirrors and fewer cameras arranged accordingly, and also by means of rigid or flexible light guides. The illumination devices facing the cameras may comprise, as already explained by way of the example of a ring light, just a single illumination device or ambient illumination as existing by chance relative to the cameras.

The invention relates, of course, not just to robotic devices but also to any manipulators with open/closed loop control.

A further example embodiment of the invention is an arrangement for type and/or position sensing of unordered or badly ordered, or one or more inaccurately positioned parts, particularly, bulk parts, imaged by means of cameras in direct light, particularly with the object of gripping or processing, involving at least three cameras being directed at the part(s) from different directions, an illumination device being provided for each of these cameras, potentially at least one part contour of a common part being in the field of view of each of the three cameras, whereby both sides of the common part can be seen by the camera, namely, on the one hand, a surface of the part illuminated by the relative opposite illumination device in each case and, on the other, a surface of the part not illuminated by the relative opposite illumination device in each case, the illumination devices and the three cameras, on the one hand, and the part(s), on the other, each being movable relative to the other.

In this context, "potentially" is to be understood that the fields of view of the cameras are oriented so that a common workpiece can be located in the fields of view with one contour each (if this is not the case, e.g. a robotic device with cameras assumes a new position to search for a workpiece; when the cameras are located fixed a transport conveyer, for instance, is advanced until a common workpiece is located in the fields of view).

In another further embodiment of the invention in an arrangement for position sensing, cameras and illumination devices are fitted to a robotic device for defined movement together relative to the part(s).

In yet another further embodiment thereof in an arrangement for position sensing with cameras and illumination devices not fitted to a robotic device, a part can be presented, preferably placed, particularly preferably by a robotic device in various defined positions in the field of view of the cameras when setting up the system.

In still another further embodiment of the invention the illumination-image capture channels can be separated in an arrangement by switching means and/or by polarization filters and/or color filters and/or by color cameras.

In yet another further embodiment of the invention a method for gripping and/or processing unordered or badly ordered, or inaccurately positioned parts, particularly, bulk parts can include an arrangement for position sensing in which image capturing by at least three cameras is done separately via the illumination device relative to each camera, preferably switching the illumination devices and image capture separate in time, and/or by polarized light, and polarization filters at the camera side, and/or by illumination devices having differing spectral ranges, and selection of spectral ranges at the camera side preferably by color cameras or spectral filters.

In still another further embodiment of the invention a method for gripping and/or processing unordered or badly ordered, or inaccurately positioned parts, particularly, bulk parts can include a robotic device and an arrangement for position sensing when setting up the system in which images of a sample part are captured in various relative positions of cameras and illumination devices, on the one hand, and of the sample part, on the other.

In yet another further embodiment of the invention in a method for gripping including an arrangement for position sensing, cameras and illumination devices can be moved in common when setting up the system for teaching the parts.

In still another further embodiment of the invention in a method for gripping including an arrangement for position sensing, a sample part can be presented in various defined positions in the field of view of the cameras when setting up the system for teaching the parts.

The invention claimed is:

1. A method for establishing a data collection
   with the aid of at least one imaging means and at least one illuminating device,
   wherein an object is imaged from at least three different imaging directions and
   illuminated from at least three different illumination directions, each in direct light,
   wherein one imaging direction each being substantially opposed to one illumination direction,
   so that from each of the three imaging directions at least one contour of the object appears with a light side and a shadow side of the object,
   and substantially the complete object is imaged from the at least three imaging directions by the at least one imaging means,
   wherein the imaging directions and the illumination directions, on the one hand, and the object, on the other, are movable defined relative to each other with several degrees of freedom,
   wherein the images and/or the data derived therefrom are stored in the data collection,
   wherein images are made in various relative positions of image capture devices and illumination devices, on the one hand, and of the object, on the other, and
   wherein the illumination devices and the image capture devices are arranged substantially star-shaped, the illumination directions as viewed from one direction comprising in pairs an angle between 75 degrees and 145 degrees, preferably 120 degrees and as viewed from one direction the imaging directions comprising in pairs an angle between 75 degrees and 145 degrees, preferably 120 degrees.

2. The method as set forth in claim 1 wherein changes in the relative positions between the images are captured and assigned to the images and wherein position indications assigned to the images or to the data derived therefrom are stored in the data collection.

3. The method as set forth in claim 1 wherein each imaging is performed substantially from the imaging directions via light from the substantially opposed illumination direction, preferably by switching and/or by polarization and/or spectral filtering and/or by use of at least one color rendering image capture device.

4. The method as set forth in claim 1 wherein several images are made between which the position of the image capture devices and illumination devices is changed mutually.

5. The method as set forth in claim 4 wherein the position of the image capture devices and illumination devices is determined by a robotic setting.

6. The method as set forth in claim 1 wherein several images are made between which the position of the object is changed.

7. The method as set forth in claim 6 wherein the position of the object is changed by means of a robotic device.

8. A method of gripping an object from a plurality of objects
   with the aid of at least one imaging means and at least one illuminating device,
   wherein the object is imaged from at least three different imaging directions and
   is illuminated from at least three different illumination directions, each in direct light,
   wherein one imaging direction each being substantially opposed to one illumination direction,
   so that from each of the three imaging directions at least one contour each of the object appears with a light side and a shadow side of the object,
   and substantially the complete object is imaged from the at least three imaging directions by the at least one imaging means,
   wherein reference images and/or data derived therefrom contained in a data collection structured as set forth in claim 1.

9. A device for gripping an object from a plurality of objects,
   with at least three image capture devices and
   at least three direct illumination devices, wherein one image capture device each is substantially opposed to one illumination device,
   so that from each of the three image capture devices at least one contour each of the object can be imaged with a light side and a shadow side of the object,
   and substantially the complete object can be imaged by the at least three image capture devices in combination,
   which is configured to use reference images and/or data derived therefrom contained in a data collection structured as set forth in claim 1.

10. A method of gripping an object from a plurality of objects
    with the aid of at least one imaging means and at least one illuminating device,
    wherein the object is imaged from at least three different imaging directions and
    is illuminated from at least three different illumination directions, each in direct light,
    wherein one imaging direction each being substantially opposed to one illumination direction,
    so that from each of the three imaging directions at least one contour each of the object appears with a light side and a shadow side of the object,
    and substantially the complete object is imaged from the at least three imaging directions by the at least one imaging means,
    wherein the at least one imaging means and at least one illuminating device comprise a substantially star-shaped arrangement of illumination devices and image capture devices, whereby as viewed from one direction the illumination directions comprise in pairs an angle between 75 degrees and 145 degrees, preferably 120 degrees and as viewed from one direction the imaging directions comprise in pairs an angle between 75 degrees and 145 degrees, preferably 120 degrees.

11. The method as set forth in claim 10 wherein images of the object and images or derived data in the data collection are compared.

12. The method as set forth in claim 10 wherein the image capturing is performed substantially from the imaging directions via light from the substantially opposed illumination direction, preferably by switching and/or by polarization and/or by spectral filtering and/or by use of at least one color rendering image capture device.

13. A non-transitory computer-readable storage medium comprising a program code which implements the method as set forth in claim 10 when read by a computer.

14. A device for gripping an object from a plurality of objects
   with at least three image capture devices and
   at least three direct illumination devices, wherein one image capture device each is substantially opposed to one illumination device,
   so that from each of the three image capture devices at least one contour each of the object can be imaged with a light side and a shadow side of the object,
   substantially the complete object can be imaged by the at least three image capture devices in combination, and
   a substantially star-shaped arrangement of illumination devices and image capture devices, whereby as viewed from one direction the illumination directions comprise in pairs an angle between 75 degrees and 145 degrees, preferably 120 degrees and as viewed from one direction the imaging directions comprise in pairs an angle between 75 degrees and 145 degrees, preferably 120 degrees.

15. The device as set forth in claim 14 configured for capturing images via light from the substantially opposed illumination direction, preferably by switching means and/or by polarization and/or spectral filters and/or by at least one color rendering image capture device.

* * * * *